(12) United States Patent
Yasuda et al.

(10) Patent No.: US 9,045,191 B2
(45) Date of Patent: Jun. 2, 2015

(54) FRAME STRUCTURE FOR SADDLED VEHICLE

(75) Inventors: Kazutoyo Yasuda, Wako (JP); Keisuke Kishikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 89 days.

(21) Appl. No.: 13/638,057

(22) PCT Filed: Feb. 28, 2011

(86) PCT No.: PCT/JP2011/001147
§ 371 (c)(1),
(2), (4) Date: Sep. 28, 2012

(87) PCT Pub. No.: WO2011/121885
PCT Pub. Date: Oct. 6, 2011

(65) Prior Publication Data
US 2013/0015634 A1 Jan. 17, 2013

(30) Foreign Application Priority Data
Mar. 30, 2010 (JP) ................. 2010-077888

(51) Int. Cl.
*B62K 11/04* (2006.01)
*B62K 19/20* (2006.01)
*B62K 19/30* (2006.01)

(52) U.S. Cl.
CPC ............... *B62K 19/20* (2013.01); *B62K 19/30* (2013.01); *B62K 11/04* (2013.01)

(58) Field of Classification Search
CPC ...... B62K 25/283; B62K 11/02; B62K 11/04; B62K 19/30; B62K 19/20

USPC ........... 180/219, 311, 312; 280/284; 228/178
See application file for complete search history.

(56) References Cited

U.S. PATENT DOCUMENTS

| | | | | |
|---|---|---|---|---|
| 3,945,463 | A * | 3/1976 | Okano et al. ................. 184/6.13 |
| 4,506,755 | A * | 3/1985 | Tsuchida et al. .............. 180/227 |
| 4,696,363 | A * | 9/1987 | Enda .............................. 180/219 |
| 4,809,999 | A * | 3/1989 | Tozawa et al. ............. 280/281.1 |
| 5,031,580 | A * | 7/1991 | Takagi et al. ............... 123/41.42 |
| 5,323,869 | A * | 6/1994 | Kurayoshi et al. ............ 180/219 |
| 5,592,999 | A * | 1/1997 | Matsuura et al. ............. 180/227 |
| 5,984,336 | A * | 11/1999 | Hanafusa et al. .......... 280/281.1 |
| 6,092,823 | A * | 7/2000 | Busby .......................... 280/284 |
| 6,547,027 | B1 * | 4/2003 | Kalhok et al. ................ 180/312 |
| 6,796,030 | B2 * | 9/2004 | Mochizuki et al. .......... 29/897.2 |
| 2005/0126844 | A1 * | 6/2005 | Ogura et al. .................. 180/311 |
| 2010/0320721 | A1 * | 12/2010 | Chung ....................... 280/281.1 |

FOREIGN PATENT DOCUMENTS

| | | |
|---|---|---|
| CN | 2 605 190 Y | 3/2004 |
| JP | 36-27404 Y1 | 10/1961 |
| JP | S56-46486 U | 4/1981 |

(Continued)

*Primary Examiner* — Anne Marie Boehler
*Assistant Examiner* — Maurice Williams
(74) *Attorney, Agent, or Firm* — Birch, Stewart, Kolasch & Birch, LLP (57) ABSTRACT

A frame structure of a saddle type vehicle that can easily secure the bending strength of welded portions by a structure that seat rails are welded to rear portions of pivot frames, etc. is provided.
Elongated holes 71A extending along an axis L of a front portion 15F of the seat rail is provided to a side surface of the pivot frame 14, and the pivot frame 14 and the front portion 15F of the seat rail are welded to each other at the peripheral edge of the elongated hole 71A.

3 Claims, 5 Drawing Sheets

(56) References Cited

FOREIGN PATENT DOCUMENTS

| JP | 61-078559 A | 4/1986 |
|---|---|---|
| JP | 61-78559 A | 4/1986 |
| JP | 63-110192 U | 7/1988 |
| JP | S63-110192 U | 7/1988 |
| JP | 4-81891 U | 7/1992 |
| JP | 9-240550 A | 9/1997 |
| JP | 09-240550 A | 9/1997 |
| JP | 2001-058624 A | 3/2001 |
| JP | 4303544 B2 | 7/2009 |

* cited by examiner

FRAME STRUCTURE FOR SADDLED VEHICLE

TECHNICAL FIELD

The present invention relates to a frame structure of a saddle type vehicle.

BACKGROUND ART

As an automatic two-wheeled vehicle, a frame structure in which a seat frame is welded to a back portion of a pivot frame is disclosed (for example, see Patent Document 1).

Patent Document 1 discloses a frame structure for a compact vehicle having a head pipe, a main pipe extending rearward and downward from the head pipe, a pair of left and right center upper pipes welded to a rear portion of a main pipe and extending rearward, center pipes extending downward from the center upper pipes, seat rails welded at upper portions of front ends thereof to rear ends of the center upper pipes and extending rearward, rear pipes extending downward from lower portions of the front ends of the seat rails, and a pair of left and right pivot frames connected to the lower portions of the rear pipes.

In this compact vehicle, the pivot frames are formed into a gusset shape, the rear pipes extending downward from the lower portions of the front ends of the seat rails are provided, and outer edges of the pivot frames and peripheral surfaces of the rear pipes are welded.

In this frame structure, a seat load acts on both of the rear pipes and the center upper pipes, and a vehicle body frame has sufficient rigidity with respect to the seat load by providing large spaces between the center upper pipes and the rear pipes. Therefore, the strength of welded portions between the rear pipes and the pivot frames is secured.

CITED REFERENCE

Patent Document

[Patent Document 1] Japanese Patent No. 4303544

DISCLOSURE OF INVENTION

Problem to be Solved by the Invention

However, in the case of a frame structure having no member which connects the seat rails and the main frames (in Patent Document 1, the rear portions of the center upper pipes) or a frame structure in which distances between the seat rails and back stays which constitute the rear pipes are small, the rigidity of the vehicle body frame with respect to the seat load can hardly be secured.

In this case, a bending stress acting on the welded portions between the pivot frames and the rear pipes is increased, so that the welded portions of the upper front surfaces of the rear pipes are subjected to a large tensile stress and the welded portions on the lower rear surfaces of the rear pipes are subjected to a large compression stress. In particular, when the pivot frame is a structure like a seashell including left and right halves, gaps are formed at upper portions and lower portions of openings which allow insertion of the rear pipes, and the gaps make welding of the pivot frames and the rear pipes difficult.

In this case, when the welded portions are subjected to a large moment from the seat load, securement of the strength may be difficult.

In view of such circumstances as described above, it is an object of the present invention to provide a frame structure of a saddle type vehicle in which the bending strength of the welded portions can easily be secured by a structure in which the seat rails are welded to the rear portions of the pivot frames.

Means for Solving the Problem

In order to solve the above-described problems, the present invention provides a frame structure for a saddle type vehicle comprising: a pivot frame (14) configured to pivotably support a rear arm (28) which supports a rear wheel (27) via a shaft at a rear portion thereof; and a seat rail (15) welded to the rear portion of the pivot frame (14) and extending rearward and upward, characterized in that hole portions (71A) extending along an axis of a front portion of the seat rail (15) is provided on a side surface of the pivot frame (14), and the pivot frame (14) and the front portion of the seat rail (15) are welded along a peripheral edge of the hole portion (71A).

In this configuration, the side surface of the pivot frame is formed with a hole portion extending along the axis of the front portion of the seat rail and the pivot frame and the front portion of the seat rail are welded along the peripheral edges of the hole portion, a welded portion between the pivot frame and the seat rail are provided at a midpoint of the seat rail in the vertical direction, so that the joint strength resistant to the bent moment due to the seat load can be secured efficiently, so that the bending strength can be achieved easily.

In this configuration, a configuration such that the pivot frame (14) may be formed by joining opening end edges (W) of left and right plate portions (81A, 81B) mated like a seashell, a seat rail insertion opening (84) is formed at a rear upper portion of the pivot frame (14) by the left and right plate portions (81A, 81B), and the hole portions (71A) are provided on both the left and right plate portions (81A, 81B) is also applicable.

In this configuration, the joint strength can be enhanced by welding both the left and right seat rails while enhancing the rigidity of the pivot frame by closing the cross-section of the pivot frame.

In this configuration, a configuration such that there is provided a back stay (16) provided at a position downward of the seat rail (15), the back stay (16) being joined to the rear portion of the pivot frame (14), extending rearward and upward, and being joined to the rear portion of the seat rail (15), and a back stay insertion opening (86) is provided at a position downward of the seat rail insertion opening (84) of the pivot frame (14), a lower hole portion (71B) is provided on a side surface of the back stay insertion opening (86) so as to extend along an axis (16L) of the front portion of the back stay (16), and the pivot frame (14) and the front portion of the back stay (16) are welded along the peripheral edge of the lower hole portion (71B) is also applicable.

In this configuration, since the lower hole portion extending along the axis of the front portion of the back stay is provided on the side surface of the back stay insertion opening of the pivot frame, and the pivot frame and the front portion of the back stay are welded along the peripheral edge of the lower hole portion, the back stay which restrains the deflection of the seat rails has the same welding structure as the seat rail, so that the bending strength against the seat load can easily be secured.

In this configuration, there may be provided a pair of the pivot frames (14) on the left and right and a cross pipe (32) between the left and right pivot frames (14), and the cross pipe (32) may be provided on an axis (15L) of the front portion of the seat rail (15) at a lower front thereof at a position adjacent thereto.

In this configuration, since the cross pipe provided between the left and right pivot frames is disposed on the axis of the front portion of the seat rail at a lower front thereof at a position adjacent thereto, the rigidity of the pivot frame in the periphery of the joint portion of the seat rail is enhanced.

In the configuration described above, the frame structure for a saddle type vehicle may be manufactured by a first step of welding a front edge (W1) of the left and right plate portions (81A, 81B) and an edge (W3) between the seat rail insertion opening (84) and the back stay insertion opening (86); a second step of inserting an assembly of the seat rail (15) and the back stay (16) into the seat rail insertion opening (84) and the back stay insertion opening (86); a third step of welding the hole portion (71A) on the outside in the vehicle width direction of the left and right plate portions (81A, 81B) and the seat rail (15), and welding the lower hole portion (71B) on the outside in the vehicle width direction and the back stay (16); and a fourth step of welding the hole portion (71A) on the inner side in the vehicle width direction and the seat rail (15) and welding the lower hole portion (71B) on the inner side in the vehicle width direction and the back stay (16), and a fifth step of welding an upper edge (W4) and a rear edge (W2) of the left and right plate portions (81A, 81B).

In this configuration, even though there is an assembly error when inserting and welding the left and right pivot frames in a state in which the seat rail and the back stay are assembled, the seat rail and the back stay can easily be inserted into the pivot frame, and the seat rail and the back stay can be joined to the pivot frame with a favorable welding quality.

In this configuration, the front portion of the seat rail (15) may have a pipe shape; the hole portion (71A) may be an elongated hole having a peripheral length equal to or longer than the peripheral length of the pipe of the front portion of the seat rail (15).

In this configuration, the hole portion for welding the pivot frame and the front portion of the seat rail is an elongated hole having the peripheral length equal to or longer than the peripheral length of the front portion of the seat rail, a long welding length can be secured, so that the joint strength can easily be secured.

The present invention also provides a frame structure for a saddle type vehicle formed by providing a hollow box-shaped member (14) by bending end portions of a pair of plate member (81A, 81B) and welding end portions thereof, and welding a plurality of pipes (15, 16) to the box-shaped member (14), characterized in that the box-shaped member (14) is provided with openings (84, 86) for allowing insertion of the pipes (15, 16), and holes (71) are formed so as to extend along the axes of the pipes (15, 16) on a side surface of the box-shaped member (14) overlapped with the inserted pipes (15, 16), and the box-shaped member (14) and the pipes (15, 16) are welded along peripheral edges of the hole portions (71). In this configuration, a welded portion between the box-shaped member and the pipe can minimize a load received by the bending moment, so that the bending strength can be secured easily.

The hole portions (71) are elongated holes extending along the axes of the pipes (15, 16) in side view. In this configuration, a long welding length can be secured, so that the strength of the welding portion can be enhanced.

Advantages of the Invention

According to the present invention, since the hole portion extending along the axis of the front portion of the seat rail is provided on the side surface of the pivot frame, and the pivot frame and the front portion of the seat rail are welded along the peripheral edge of the hole portion, the bending strength of the welding portion can easily be secured in a configuration in which the seat rail is welded to the rear portion of the pivot frame.

With a configuration in which the pivot frame is formed by joining the opened end edges of the left and right plate portions mated with each other like a seashell, the seat rail insertion opening is provided on the rear upper portion of the pivot frame by the left and right plate portions, and the hole portions are provided on both the left and right plate portions, the joint strength can be enhanced by welding both the left and right seat rails while enhancing the rigidity of the pivot frame by closing the cross-section of the pivot frame.

With the configuration in which the lower hole portion extending along the axis of the front portion of the back stay is provided on the side surface of the back stay insertion opening of the pivot frame, and the pivot frame and the front portion of the back stay are welded along the peripheral edge of the lower hole portion, the back stay which restrains the deflection of the seat rails has the same welding structure as the seat rail, so that the bending strength against the seat load can easily be secured.

With the configuration in which the pair of left and right pivot frames are provided, and the cross pipe is provided between the left and right pivot frames, and the cross pipe is disposed on the axis of the front portion of the seat rail at a lower front thereof at a position adjacent thereto, the rigidity of the pivot frame in the periphery of the joint portion of the seat rail can further be enhanced.

By manufacturing the frame structure according to a first step of welding a front edge of the left and right plate portions and an edge between the seat rail insertion opening and the back stay insertion opening; a second step of inserting an assembly of the seat rail and the back stay into the seat rail insertion opening and the back stay insertion opening; a third step of welding the hole portion on the outside in the vehicle width direction of the left and right plate portions and the seat rail, and welding the lower hole portion on the outside in the vehicle width direction and the back stay; and a fourth step of welding the hole portion on the inner side in the vehicle width direction and the seat rail and welding the lower hole portion on the inner side in the vehicle width direction and the back stay, and a fifth step of welding an upper edge and a rear edge of the left and right plate portions, when inserting and welding the seat rail and the back stay in the assembled state into the left and right pivot frame, even though there is an assembly error, the seat rail and the back stay can be inserted into the pivot frame easily, and the seat rail and the back stay can be joined to the pivot frame with a desirable welding quality.

By forming the front portion of the seat rail into a pipe shape, and the front portion to be an elongated hole having a peripheral length equal to or longer than the peripheral length of the pipe of the front portion of the seat rail, a long welding length can be secured and the joint strength can be secured further easily.

In a frame structure for a saddle type vehicle formed by providing a hollow box-shaped member by bending end portions of a pair of plate member and welding the end portions thereof, and welding a plurality of pipes to the box-shaped member, since the box-shaped member is provided with openings for allowing insertion of the pipes, holes are formed so as to extend along the axes of the pipes on a side surface of the box-shaped member overlapped with the inserted pipes, and the box-shaped member and the pipes are welded along the peripheral edges of the hole portions, the load applied to the welded portion between the box-shaped member and the pipe due to the bending moment can be minimized, so that the bending strength can easily be secured.

In this case, by employing the elongated hole which extend along the axes of the pipes in side view as the hole portions, the welding length can be increased, and the strength of the welding portion can be enhanced.

BEST MODE FOR CARRYING OUT THE INVENTION

Referring now to the drawings, an embodiment of the present invention will be described. In the description, expressions such as front, rear, left, and right are the directions with respect to the vehicle body unless otherwise specifically mentioned.

Figure 1:
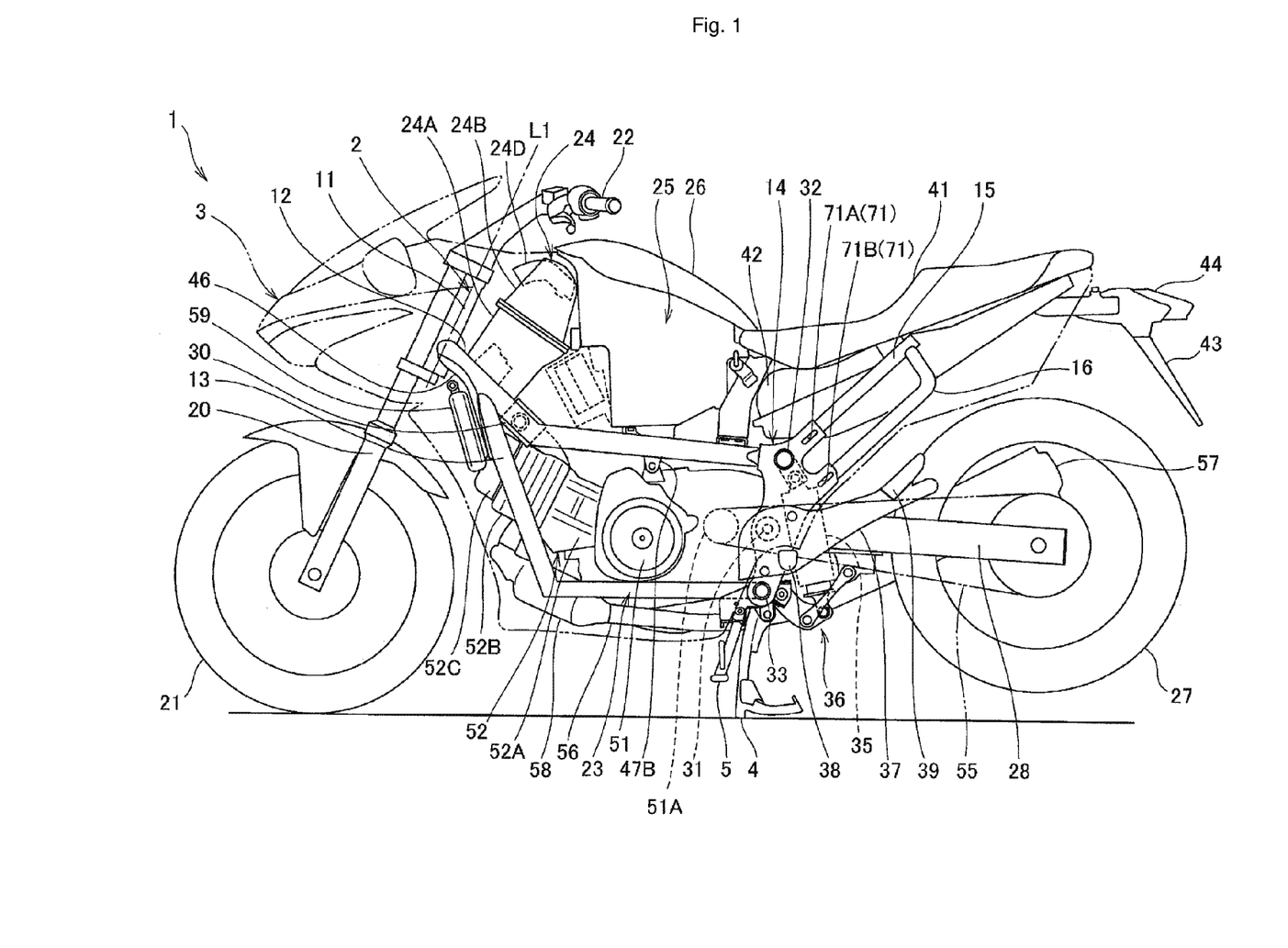
FIG. 1 is a left side view of an automatic two-wheeled vehicle according to an embodiment of the present invention.

FIG. 1 is a left side view of an automatic two-wheeled vehicle 1 according to an embodiment of the present invention.

A vehicle body frame 2 of the automatic two-wheeled vehicle 1 is formed by connecting a plurality of types of metallic components integrally by welding or the like, and includes a head pipe 11, a pair of left and right main frames 12 extending rearward and downward from the head pipe 11, a pair of left and right down frames (also referred to as "cradle frame") 13 extending downward from the main frames 12 and supporting a front end portion of an engine 23, a pair of left and right pivot frames 14 connected to rear end portions of the main frames 12, a pair of left and right seat rails 15 connected to rear portions of the pivot frames 14 and extending rearward and upward, and back stays 16 bridging between the pivot frames 14 and the seat rails 15.

The frames of the vehicle body frame 2 other than the pivot frames 14 (the head pipe 11, the main frames 12, the downframes 13, the seat rails 15, and the back stays 16) are metallic pipes formed of metallic materials such as steel material or the like, and the pivot frames 14 are plate-shaped members formed of metallic material. In FIG. 1, reference numeral 3 designates a vehicle body cowl covering the vehicle body frame 2, reference numeral 4 designates a center stand for parking the vehicle body on the ground in a vertical position, and reference numeral 5 designates a side stand for parking the vehicle body in a state of inclined leftward.

Figure 2:
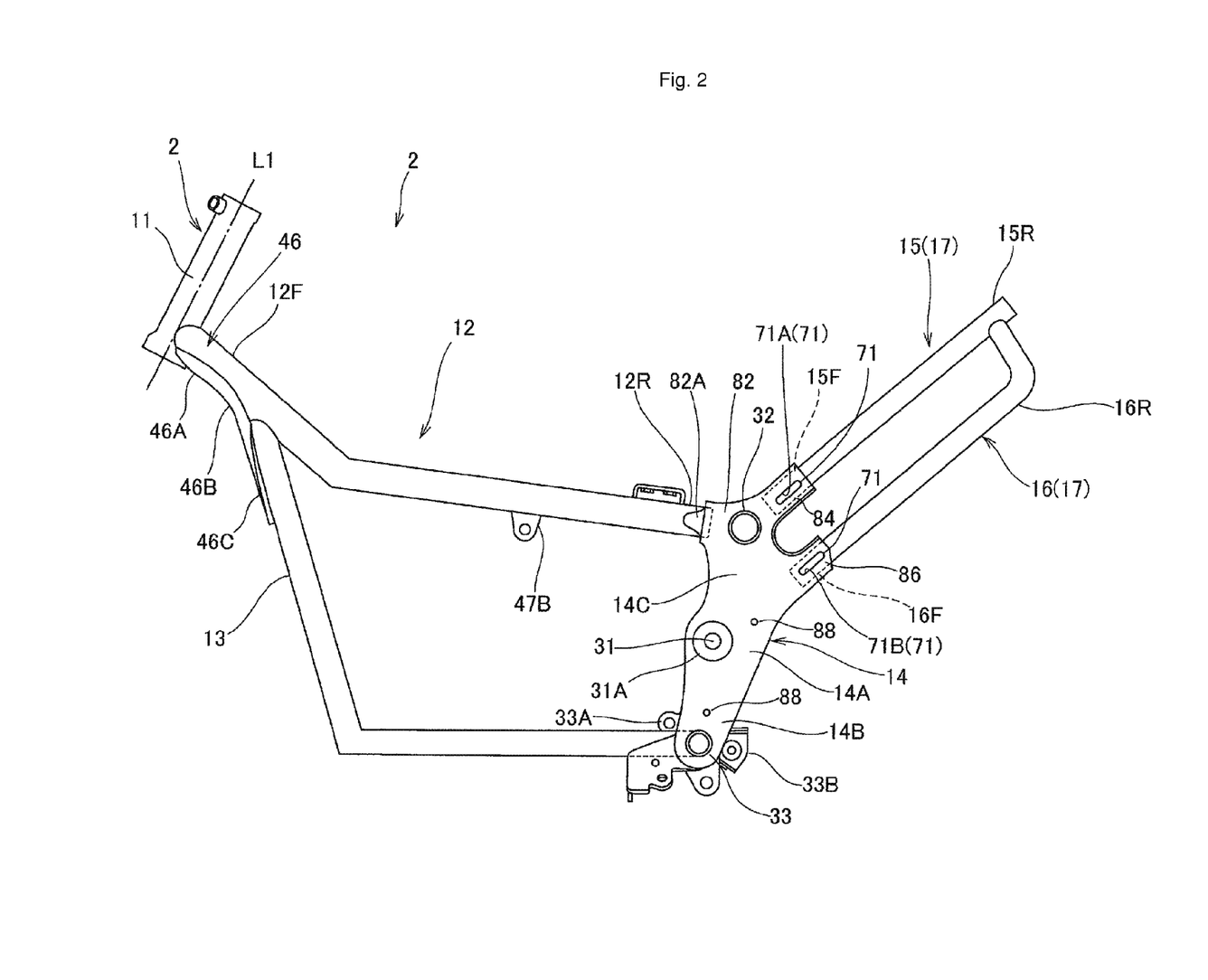
FIG. 2 is a drawing of a vehicle body frame of the automatic two-wheeled vehicle viewed from the side.

FIG. 2 is a drawing of the vehicle body frame 2 of the automatic two-wheeled vehicle 1 viewed from the side. In the drawings, reference numeral L1 designates an axial line of the head pipe 11.

The head pipe 11 is arranged so as to incline rearward and upward from a widthwise center of a front portion of the vehicle, and supports a pair of left and right front forks 20 (see FIG. 1) so as to be steerable in the left and right direction. As shown in FIG. 1, a front wheel 21 is rotatably supported at lower portions of the front forks 20 and a steering handle 22 is supported on an upper portion of the front forks 20. In other words, the head pipe 11 supports a steering device which constitutes a steering system of the automatic two-wheeled vehicle 1.

The pair of left and right main frames 12 extend from the left and right of the lower portion of the head pipe 11 so as to incline rearward and downward in side view, and extend rearward so as to broaden outward in the vehicle width direction, and the rear ends thereof are connected to the front upper portions of the left and right pivot frames 14.

The left and right main frames 12 are frames configured to support the engine 23 as an internal combustion engine, an air cleaner 24, a storage box 25, and so on. As shown in FIG. 1, the air cleaner 24 is supported above the front portions of the left and right main frames 12 in a position inclined in parallel to the axial line L1 of the head pipe 11 upward and rearward, includes an air cleaner lower case 24A opening rearward and upward, and an air cleaner upper cover 24B covering opening surface of the air cleaner lower case 24A, and the air cleaner upper cover 24B includes a duct 24D for introducing the outside air.

As shown in FIG. 1, the storage box 25 is supported rearward of the air cleaner 24 above the rear portions of the left and right main frames 12, and rotatably supports a lid member 26 configured to cover the upper opening of the storage box 25 so as to be openable and closable.

The engine 23 is supported downward of the left and right main frames 12, rearward of the left and right downframes 13, and forward of the pivot frames 14, thereby being suspended in the vehicle body frame 2 at a lower center in the fore and aft direction.

As shown in FIG. 2, the left and right pivot frames 14 extend downward from joint portions with respect to rear portions 12R of the left and right main frames 12 (the rear portion of the main frame) (see FIG. 2) and are supported by a pivot shaft 31 penetrating through supporting portions 14A at midpoints in the vertical direction. The pivot shaft 31 is arranged in parallel to the vehicle width direction, and rear arms (also referred to as "swing arms") 28 (see FIG. 1) which support a rear wheel 27 (see FIG. 1) at rear portions thereof are supported via the pivot shaft 31 so as to be pivotable in the vertical direction. The left and right pivot frames 14 are provided with cross pipes 32, 33 extending in the vehicle width direction above and below the pivot shaft 31.

An upper end portion of a single rear cushion 35 (see FIG. 1) is rotatably connected to the upper cross pipe 32 via an upper cushion supporting portion provided at the center in the vehicle width direction. The lower end portion of the rear cushion 35 is connected to the rear arm 28 via a link mechanism 36 (see FIG. 1).

The lower cross pipe 33 is provided with an engine hanger 33A extending forward from the cross pipe 33 and supporting a rear lower portion of the engine 23 and a link supporting portion 33B extending rearward from the cross pipe 33 and supporting the link mechanism 36.

Step holders 37 are mounted on outsides of the left and right pivot frames 14 (see FIG. 1) in the vehicle width direction. The step holders 37 extend rearward from the pivot frames 14, and main steps 38 for allowing the rider to place his or her feet are mounted to front portions of the step holders 37 and pillion steps 39 for allowing a fellow passenger to place his or her feet are mounted to rear portions of the step holders 37.

The seat rails 15 and the back stays 16 are connected on rear upper portions of the pivot frames 14 at a distance in the vertical direction and parallel to each other (see FIG. 2).

As shown in FIG. 2, the seat rail 15 is welded to the pivot frame 14, and includes a seat rail front portion 15F extending linearly rearward and upward from the pivot frame 14 and a seat rail rear portion 15R extending rearward and upward from the seat rail front portion 15F.

The back stay 16 is welded to the pivot frame 14 at a position downward of the seat rail 15, and includes a back stay front portion 16F extending linearly rearward and upward from the pivot frame 14 and a back stay rear portion 16R extending linearly rearward and upward from the back stay front portion 16F and then bent upward and welded to the seat rail rear portion 15R. The back stay front portion 16F of the back stay 16 extends linearly and rearward and upward at an inclination parallel to the seat rail front portion 15F.

In this manner, the left and right seat rails 15 and the back stays 16 constitute a rear frame 17 of the automatic two-wheeled vehicle 1. In the rear frame 17, the back stays 16 bridge the seat rails 15 and the pivot frames 14, so that pivotal deflection of the seat rails 15 can be restrained by the back stays 16, so that the rigidity of the frame can be enhanced.

The seat rails 15 support a rider's seat 41, and also support a fuel tank 42 at a position downward of the rider's seat 41 as shown in FIG. 1. The seat rails 15 also support a rear fender 43, a rear lamps 44, and so on at a position rearward of the rider's seat 41.

The rider's seat 41 is formed into a seat elongated in the fore-and-aft direction having the rider's seat and the fellow passenger's seat integrally, and the storage box 25 is arranged in front of the rider's seat 41 so as to be adjacent thereto.

The automatic two-wheeled vehicle 1 includes the engine 23 disposed at the lower center of the vehicle body frame 2 in the fore-and-aft direction, the high-capacity storage box 25 disposed upward of the engine 23, the fuel tank 42 disposed rearward of the storage box 25. Therefore, relatively heavy components (the engine 23, the fuel tank 42 filled with fuel therein, and the storage box 25 having items loaded therein) can be arranged at the center in the fore-and-aft direction of the vehicle, so that the concentration of the mass is achieved.

As shown in FIG. 1 and FIG. 2, the left and right down frames 13 extend linearly downward from front portions 12F of the main frames 12 (referred to as "main frame front portion") and then are bent rearward and connected to the pivot frames 14.

As shown in FIG. 2, a single gusset plate 46 is provided on a portion from a lower portion of the head pipe 11 to the down frames 13, which is the front lower portion of the vehicle body frame 2.

The gusset plate 46 is a substantially U-shaped metallic plate-shaped component extending from the head pipe 11 to the pair of left and right down frames 13, and integrally includes a first covering portion 46A configured to cover a joint portion between the head pipe 11 and the main frames 12 from below, left and right second covering portions 46B configured to cover a joint portion between the main frames 12 and the down frames 13 from the front underside continuously from the first covering portion 46A, and left and right third covering portions 46C extending downward from the second covering portions 46B to midpoints of the down frames 13.

Peripheral edges of the first to third covering portions 46A to 46C are joined to the head pipe 11, the main frames 12, and the down frames 13 by continuous welding. Accordingly, the respective joint portions of the head pipe 11, the main frames 12, and the down frames 13 can be reinforced with the single gusset plate 46, so that the rigidity of the vehicle body frame 2 can be enhanced.

The engine 23 is a parallel two-cylinder four-stroke engine having a cylinder portion 52 inclined forward and upward from a front upper portion of a crankcase 51 as shown in FIG. 1.

The engine 23 is supported in such a manner that the front portion of the crankcase 51 is supported by the down frames 13 via an engine hanger (not shown), an upper portion of the crankcase 51 is supported by the main frame 12 via an engine hanger 47B, and a rear portion of the crankcase 51 is supported by the cross pipe 33 between the pivot frames 14 via the engine hanger 33A (see FIG. 2).

The cylinder portion 52 includes a cylinder block 52A connected to a front upper portion of the crankcase 51, a cylinder head 52B connected to an upper portion of the cylinder block 52A, and a cylinder head cover 52C covering the upper portion of the cylinder head 52B.

An engine output shaft 51A is provided on the left rear portion of the crankcase 51 of the engine 23. The engine output shaft 51A and the rear wheel 27 are connected so as to be capable of transmitting the power via a drive chain (referred to as "chain") 55, and the power of the engine 23 is transmitted to the rear wheel 27 via the drive chain 55.

The air cleaner 24 is connected to the back side of the cylinder portion 52 of the engine 23 via a throttle body 30. Accordingly, the engine air-inlet system including the throttle body 30 and the air cleaner 24 is collectively disposed on the front upper portion of the engine 23.

An exhaust pipe 56 is connected to a front surface of the cylinder portion 52, and the exhaust pipe 56 extends downward from the cylinder portion 52, is bent rearward, extends rearward through a left side of the engine 23, extends between the engine 23 and the rear wheel 27 through the opposite side in the vehicle width direction (right side), and is connected to a muffler 57. An engine exhaust system is made up of the exhaust pipe 56 and the muffler 57.

A catalytic converter 58 is provided at a midsection of the exhaust pipe 56. The catalytic converter 58 is provided on the left lower portion of the engine 23 in the vicinity of an inlet port of the exhaust pipe 56 (in the vicinity of the cylinder portion 52), whereby high-temperature exhaust gas immediately after having exhausted from the cylinder portion 52 is flowed to the catalytic converter 58, and the catalytic converter 58 and the muffler 57 are allowed to be arranged on the left side and the right side separately.

The engine 23 is a water-cooled engine, and includes a radiator 59 for cooling engine cooling water supported by the vehicle body frame 2 (the down frames 13) at the upper front portion of the cylinder portion 52 (see FIG. 1).

Incidentally, in the automatic two-wheeled vehicle 1, the distance between the seat rails 15 and the back stays 16 are narrowed with a layout which connects the seat rails 15 as the rear pipes and the back stays 16 at a position rearward of the pivot frames 14.

In the case of this frame layout, a seat load as a load from the side of the rider's seat 41 acts on an upper sides of the rear pipes (the seat rails 15, the back stays 16) as a tensile load, and acts on the lower sides of the respective rear pipes (the seat rails 15, the back stays 16) as a compression load. Therefore, the joint portions between the rear pipes and the pivot frames 14 may subject to a large bending moment.

Therefore, in this configuration, the side surfaces of the pivot frames 14 are formed with elongated holes 71 (see FIG. 2) as hole portions extending along the axes of the respective rear pipes (the seat rails 15 and the back stay 16), and peripheral edges (inner peripheral edges) of the respective elongated holes 71 are respectively welded to the rear pipes.

Figure 3:
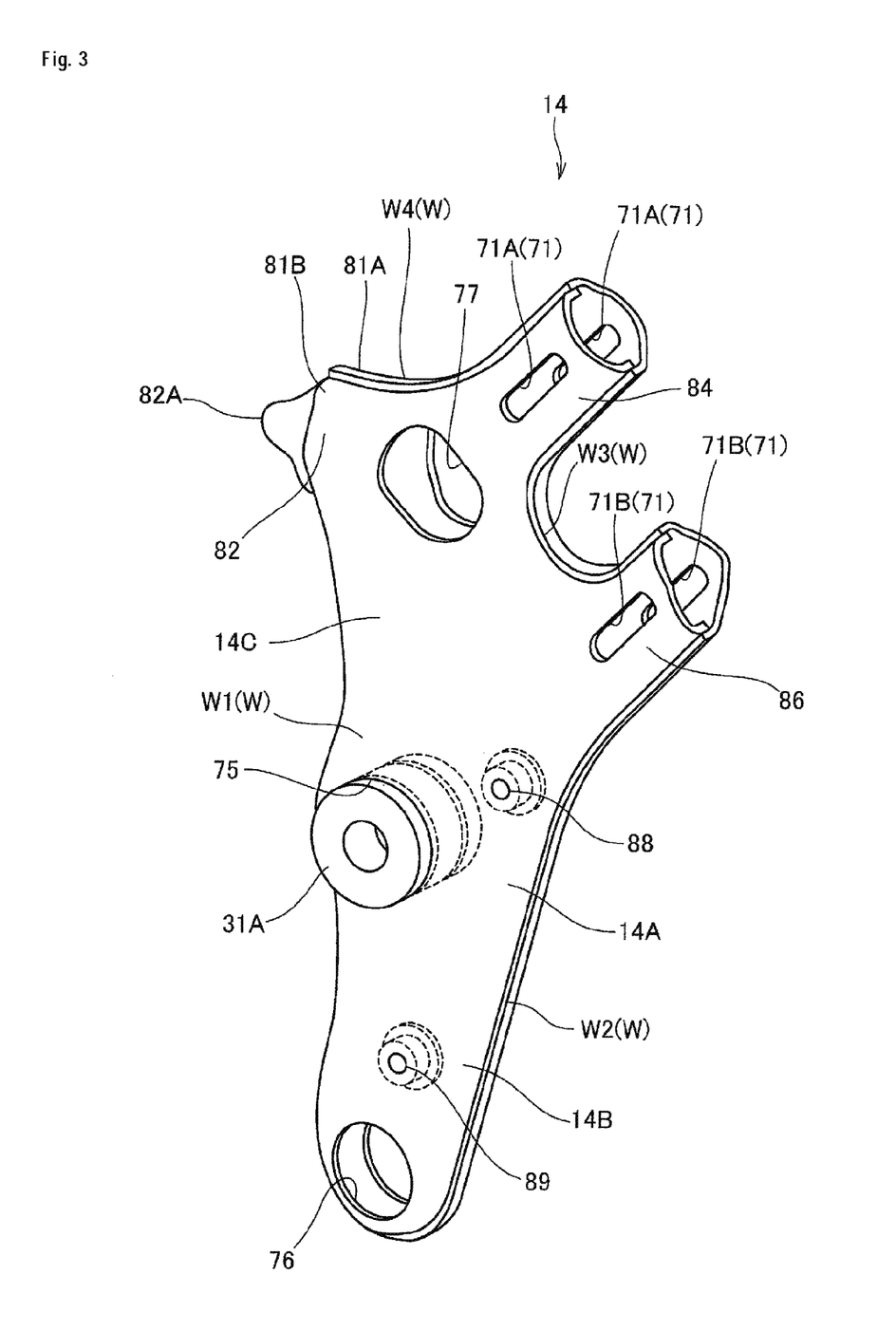
FIG. 3 is a perspective view of a right pivot frame.
Figure 4:
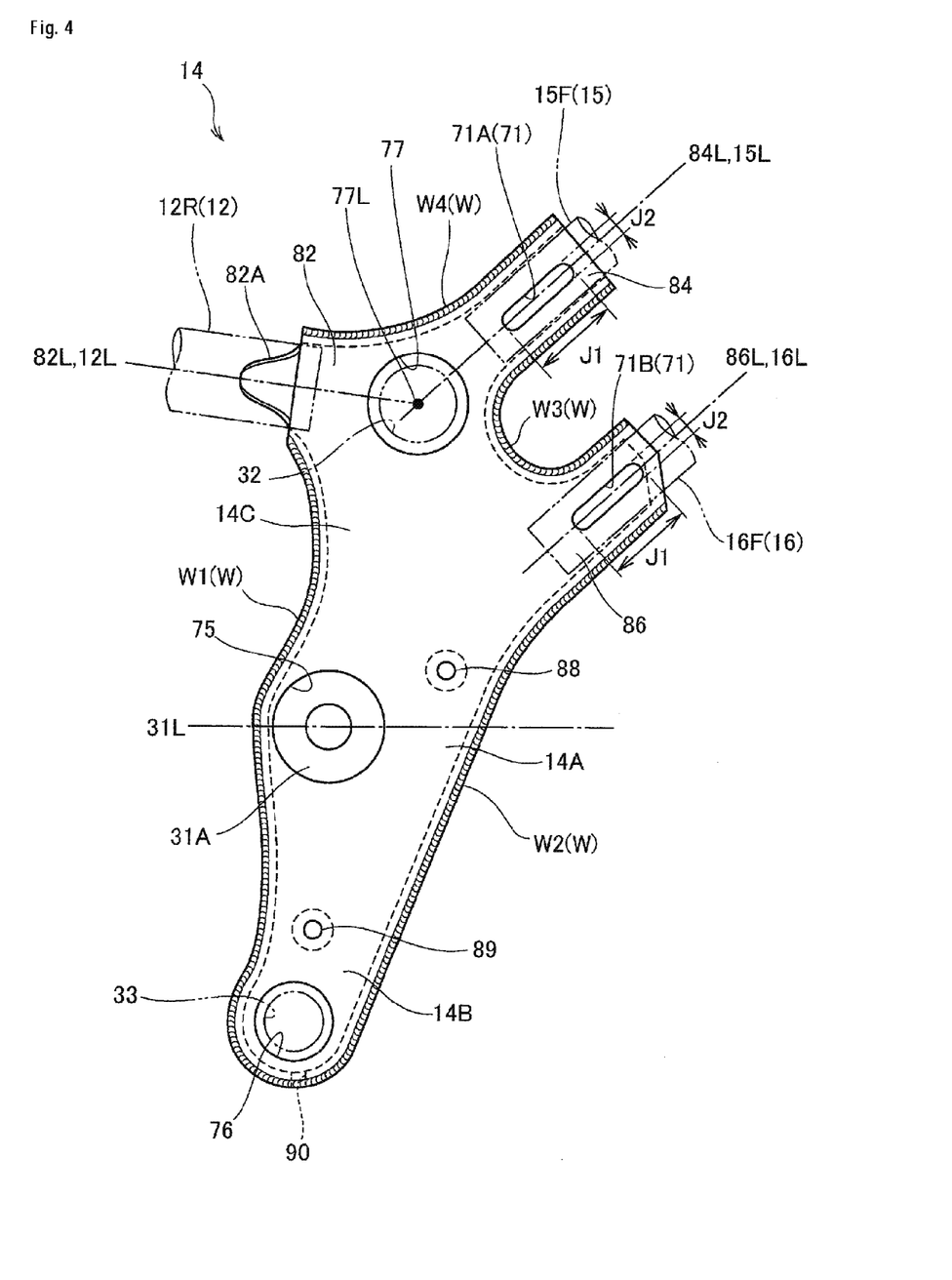
FIG. 4 is a side view of the right pivot frame.
Figure 5:
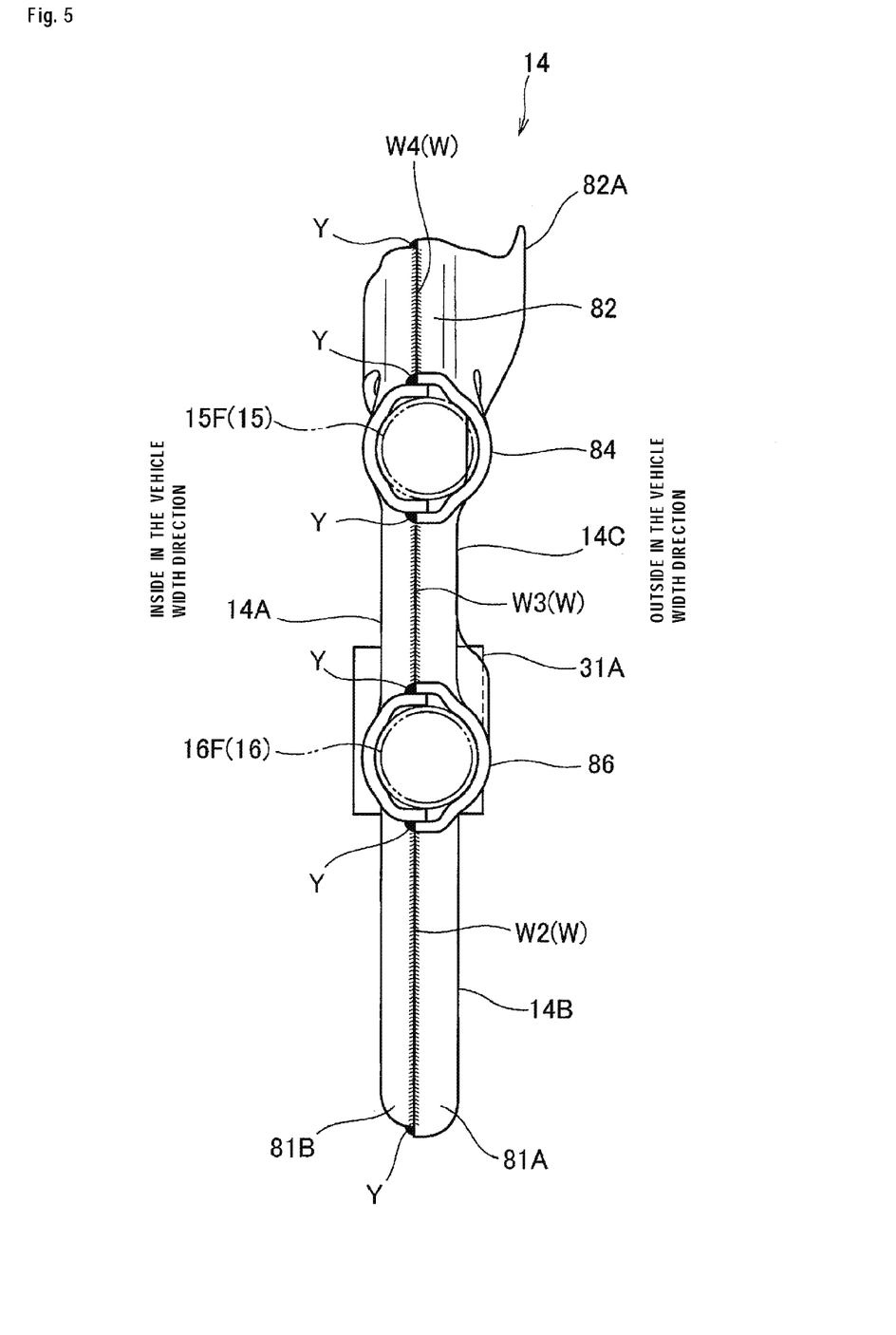
FIG. 5 is a back view of the right pivot frame.

FIG. 3 is a perspective view of the pivot frames 14, FIG. 4 is a side view, and FIG. 5 is a back view thereof. Here, the left and right pivot frames 14 have left-right symmetry, and the right pivot frames 14 is shown in FIG. 3 to FIG. 5.

As shown in FIG. 3 to FIG. 5, the pivot frames 14 is a vertically elongated hollow component (hollow box-shaped member) formed by mating a front side pivot frame half 81A and a back side pivot frame half 81B, which are two press-molded plate material (plate member), like a seashell, and welding outer peripheral edges W as opened end edges with each other to join the same integrally.

The outer shape of the front side pivot frame half 81A is formed slightly larger than the outer shape of the back side pivot frame half 81B, so that the back side pivot frame half 81B is fitted into the inside of the front side pivot frame half 81A, which is a larger half, so that the mutual positioning is easily achieved. Since the outer shape of the front side pivot frame half 81A is larger than the outer shape of the back side pivot frame half 81B, as shown in FIG. 5, the welded points on the outer peripheral edge W (shown by reference sign Y in FIG. 5) can be prevented from being exposed to the outside in the vehicle width direction.

The pivot frame 14 integrally includes the supporting portion 14A supporting the pivot shaft 31, a downward extending portion 14B extending downward from the supporting portion 14A, and an upward extending portion 14C extending upward from the supporting portion 14A.

The supporting portion 14A is provided with a through hole 75 for allowing passage of a color 31A (see FIG. 3) for inserting the pivot shaft 31, the downward extending portion 14B is formed with a through hole 76 for allowing penetration of the lower cross pipe 33, and the upward extending portion 14C is provided with a through hole 77 penetrating through the upper cross pipe 32.

In this manner, since the through holes 76, 77 for the cross pipes 32, 33 are provided at a distance in the vertical direction so as to sandwich the pivot frames 14, the cross pipes 32, 33 can be bridged between the pivot frames 14 away from each other in the vertical direction, so that the frame rigidity of the left and right pivot frame 14 can effectively be enhanced.

A front side cylinder 82 which serves as a main frame insertion opening for allowing insertion of the main frame 12 is provided integrally on the upper front portion of the upward extending portion 14C. The front side cylinder 82 has a cylindrical shape extending forward from the cross pipe 32, and the front side cylinder 82 and the main frame 12 are joined by inserting the rear portion 12R of the main frame from the front and continuously welding the outer peripheral surface of the rear portion 12R of the main frame and the outer edge of the front side cylinder 82.

As shown in FIG. 4, the cross pipe 32 is disposed in such a manner that an axis 77L thereof passes on an axial line 82L of the front side cylinder 82. Therefore, the rigidity of the entire front side cylinder 82 can be efficiently enhanced by the cross pipe 32, and the rigidity of the joint portion of the main frame 12 can be effectively enhanced. The axial line 82L of the front side cylinder 82 is coincident with an axial line 12L of the rear portion 12R of the main frame.

The front side cylinder 82 is provided with a front projecting portion 82A projecting forward on the outside in the vehicle width direction, and a long welded length is secured by welding the outer edge of the front projecting portion 82A to the main frame 12, so that the joint strength is enhanced.

In contrast, as shown in FIG. 3 to FIG. 5, a rear side first cylinder 84 as a seat rail insertion opening which allows the insertion of the seat rail 15 and a rear side second cylinder 86 as a back stay insertion opening which allows the insertion of the back stay 16 at a position downward of the rear side first cylinder 84 are integrally provided on an upper rear portion of the upward extending portion 14C.

The rear side first cylinder 84 has a cylindrical shape extending from the cross pipe 32 rearward and upward, and the seat rail front portion 15F is inserted thereto from an upper rear side of the rear side first cylinder 84.

The rear side second cylinder 86 has a cylindrical shape extending rearward and upward in parallel to the rear side first cylinder 84 at a position downward of the cross pipe 32 and the rear side first cylinder 84, and the back stay front portion 16F is inserted thereto from upper rear side of the rear side second cylinder 86.

In other words, as shown in FIG. 4, an axial line 84L of the rear side first cylinder 84 matches an axial line 15L of the seat rail front portion 15F, and an axial line 86L of the rear side second cylinder 86 matches an axial line 16L of the back stay front portion 16F.

The rear side first cylinder 84 and the rear side second cylinder 86 are formed with pairs of left and right elongated holes 71. The rear side first cylinder 84 and the seat rail front portion 15F are joined and the rear side second cylinder 86 and the back stay front portion 16F are joined by continuous welding the inner peripheral edges of the respective elongated holes 71.

As shown in FIG. 4, the axial line 84L of the rear side first cylinder 84 and the axial line 86L of the rear side second cylinder 86 are formed to extend in parallel. Therefore, the seat rail 15 and the back stay 16 can be assembled to the respective cylinders 84, 86 in a state in which the seat rail front portion 15F and the back stay front portion 16F are arranged in parallel, that is, in a state in which the seat rail 15 and the back stay 16 are assembled.

In addition, the axial line 84L of the rear side first cylinder 84 is formed to pass on the axis 77L of the cross pipe 32 (see FIG. 4). Therefore, the strength of the entire rear side first cylinder 84 can be easily enhanced by the cross pipe 32, and the rigidity of the joint portion between the pivot frames 14 and the seat rail front portion 15F can be enhanced efficiently.

In this configuration, since the cross pipe 32 is disposed between the rear side first cylinder 84 and the front side cylinder 82 with the axis 77L on the axial line 84L of the rear side first cylinder 84 and also on the axial line 82L of the front side cylinder 82, the strength of the both rear side first cylinder 84 and the front side cylinder 82 can be efficiently enhanced.

Subsequently, the elongated holes 71 will be described in detail. Hereinafter, when describing the elongated holes 71 of the rear side first cylinder 84 and the elongated holes 71 of the rear side second cylinder 86 as distinguished from each other, the former is referred to as elongated holes 71A and a latter is referred to as elongated holes 71B.

As shown in FIG. 3, the elongated holes 71A are a pair of left and right hole portions formed on the outside in the vehicle width direction and the inside in the vehicle width direction of the rear side first cylinder 84, and are formed at the same position in the same shape in side view. The elongated holes 71A are formed at a position overlapped with the seat rail front portion 15F inserted into the rear side first cylinder 84 in side view into a through hole extending in the fore-and-aft direction along the axial line 15L of the seat rail front portion 15F.

The elongated holes 71A are formed into an elongated holes having the length of the peripheral edge thereof (that is, the peripheral length) is longer than the peripheral length of the seat rail front portion 15F as a pipe to be welded via the elongated holes 71A. In this case, since the peripheral length per elongated hole 71A substantially matches the welding length of the elongated hole 71A, the welding length as long as or longer than the welding length when continuously welding the entire outer periphery of the seat rail front portion 15F can be secured only with the single elongated hole 71A. Therefore, the double or more welding length can be secured with the left and right elongated holes 71A.

More specifically, when the peripheral length of the seat rail front portion 15F is 90 mm, a long axis J1 of the elongated hole 71A is set to approximately 40 mm, and a short axis J2 is set to 10 mm, so that the same welding length (approximately 100 mm) as the peripheral length of the elongated hole 71A can be secured with a single elongated hole 71A. Also, by securing the length of the short axis J2 to a length of 10 mm or longer, a sufficient space for welding work is secured in the elongated holes 71A.

The elongated holes 71B are lower hole portions positioned downward of the elongated holes 71A of the rear side first cylinder 84 and, as shown in FIG. 3, is formed outside and inside of the rear side second cylinder 86 in the vehicle width direction and is formed at the same position in the same shape in side view.

The elongated holes 71B are formed at a position overlapped with the back stay front portion 16F inserted into the rear side second cylinder 86 in side view into a through hole extending in the fore-and-aft direction along the axis 16L of the back stay front portion 16F as shown in FIG. 4.

The elongated holes 71B are formed into an elongated holes having the length of the peripheral edge thereof (that is, the peripheral length) is longer than the peripheral length of the back stay front portion 16F as a pipe to be welded via the elongated holes 71B. Accordingly, double or more the welding length can be secured in comparison with the case of continuously welding the entire outer periphery of the back stay front portion 16F.

In this configuration, the seat rail front portion 15F and the back stay front portion 16F are formed of the pipes having the same diameter, and the elongated holes 71A, 71B are formed into the same shape, and the long axis J1 and the short axis J2 of the elongated holes 71A, 71B are the same length.

The supporting portion 14A of the pivot frames 14 is provided with step holder tightening portions 88, 89 at positions above and below a horizontal axial line 31L passing through the pivot shaft 31, and the step holders 37 (see FIG. 1) is fixed to the step holder tightening portions 88, 89 via tightening members (tightening bolts).

Subsequently, the welded portion of the pivot frame 14 will be described.

The pivot frame 14 is welded by mating the front side pivot frame half 81A and the back side pivot frame half 81B into a seashell shape, the welding portion of the pivot frame 14 is the outer peripheral edge W.

The outer peripheral edge W includes a front edge portion W1 which corresponds to the front edge of the pivot frame 14, a rear edge portion W2 which corresponds to the rear edge of the pivot frame 14, a rear upper edge portion W3 which corresponds to the rear upper edge of the pivot frame 14, and an upper edge portion W4 which corresponds to the upper edge of the pivot frame 14.

More specifically, the front edge portion W1 corresponds to the outer peripheral edge W from the lower end of the front side cylinder 82 to the lower end of the pivot frame 14, the rear edge portion W2 corresponds to the outer peripheral edge W from the lower end of the pivot frame 14 to the lower end of the rear side second cylinder 86, the rear upper edge portion W3 corresponds to the outer peripheral edge W from the lower end of the rear side first cylinder 84 to the upper end of the rear side second cylinder 86, and the upper edge portion W4 corresponds to the outer peripheral edge W from the front end of the rear side first cylinder 84 to the upper end of the front side cylinder 82.

At a boundary between the front edge portion W1 and the rear edge portion W2, which is the lower most position of the pivot frame 14, a through hole 90 which penetrates therethrough in the vertical direction and functions as a drain hole. Therefore, drain from the pivot frame 14 is enabled by the through hole 90.

Subsequently, the procedure of welding of the pivot frame 14 will be described.

When welding the pivot frame 14, the front edge portion W1 of the pivot frame 14 and the rear upper edge portion W3 of the pivot frame 14, which is positioned between the rear side first cylinder 84 and the rear side second cylinder 86 are welded first (first step).

On the other hand, a rear frame assembly which constitutes the rear frames 17 is manufactured in advance by assembling the left and right seat rails 15 and the back stays 16 and, after the first step, is set to a state in which the seat rail front portions 15F and the back stay front portions 16F of the rear frame assembly are inserted into the rear side first cylinder 84 and the rear side second cylinder 86 of the pivot frame 14, respectively (second step).

Subsequently, the elongated holes 71A provided on the rear side first cylinders 84 on the outside in the vehicle width direction and the seat rail front portion 15F are welded, and the elongated holes 71B provided on the rear side second cylinder 86 on the outside in the vehicle width direction and the back stay front portion 16F are welded (third step).

Subsequently, the elongated holes 71A provided on the rear side first cylinders 84 on the inside in the vehicle width direction and the seat rail front portion 15F are welded, and the elongated holes 71B provided on the rear side second cylinder 86 on the inside in the vehicle width direction and the back stay front portion 16F are welded (fourth step), and then the upper edge portion W4 and the rear edge portion W2 of the pivot frame 14 are welded (fifth step).

By performing the first to the fifth steps in sequence, welding of all the outer peripheral edge W of the pivot frame 14 and joining of the seat rail 15 and the back stay 16 to the pivot frame 14 are achieved.

According to this procedure, the seat rail 15 and the back stay 16 which are formed as a subassembly of the rear frame assembly are inserted into the pivot frame 14 in a state in which the front edge portion W1 and the rear upper edge portion W3 of the pivot frame 14 are joined and the upper edge portion W4 and the rear edge portion W2 are not joined. Therefore, even though there is an assembly error, the seat rail 15 and the back stay 16 can be inserted easily into the pivot frame 14.

Also, since the upper edge portion W4 and the rear edge portion W2 of the pivot frame 14 are joined after having joined the seat rail 15 and the back stay 16 to the pivot frame 14, the seat rail 15 and the back stay 16 can be joined to the pivot frame with a favorable welding quality.

As described thus far, in this embodiment, the pivot frame 14 is formed with the elongated holes 71A extending along the axial line 15L of the seat rail front portion 15F on the side surfaces of the pivot frame 14, and pivot frame 14 and the seat rail front portion 15F are welded along the peripheral edges of the elongated holes 71A as shown in FIG. 4, the pivot frame 14 and the seat rail front portion 15F can be welded between the side surfaces with respect to each other, the long welding length can be secured.

In this case, the welded portion between the pivot frame 14 and the seat rail front portion 15F extends along the axis 15L at a vertical midpoint of the seat rail front portion 15F. Therefore, the joint strength of the seat rail front portion 15F resistant to the bending moment in the vertical direction can easily be secured.

In the automatic two-wheeled vehicle 1, the seat load acts as the tensile load on the upper side of the seat rail front portion 15F and acts as the compression load on the lower side, thereby acting as the bending moment in the vertical direction of the seat rail front portion 15F. In this configuration, since the joint strength resistant to the bending moment can be secured efficiently, the bending strength with respect to the seat load can be secured easily.

In this configuration, the pivot frame 14 is formed by joining the outer peripheral edges W of the front side pivot frame half 81A and the back side pivot frame half 81B, which are left and right plate members which can be mated with each other like a seashell, the rear side first cylinder 84 which serves as the seat rail insertion opening is provided on the rear upper portion of the pivot frame 14 by these left and right pivot frame halves 81A, 81B, and the elongated holes 71A are provided on both the left and right pivot frame halves 81A, 81B. Therefore, the joint strength can be enhanced by welding both the left and right of the seat rails 15 while enhancing the rigidity of the pivot frames 14 by forming the same to have a closed cross section.

Since the back stay 16 whose both ends are joined to the rear portions of the pivot frames 14 and the rear portions of the seat rails 15 is provided downward of the seat rail 15, the rear side second cylinder 86, which is a back stay insertion opening, is provided downward of the rear side first cylinder 84 of the pivot frame 14, the elongated holes 71B as the lower side hole portion extending along the axial line 16L of the back stay front portion 16F is provided on the side surface of the rear side second cylinder 86, and the pivot frame 14 and the back stay front portion 16F are welded along the peripheral edge of the elongated holes 71B, whereby the back stay 16 which restrains the deflection of the seat rails 15 has the same welding structure as the seat rail 15, so that the bending strength against the seat load can easily be secured.

In this configuration, since the cross pipe 32 provided between the left and right pivot frames 14 is disposed on the axial line 15L of the seat rail front portion 15F at a lower front thereof at a position adjacent thereto, the rigidity of the pivot frame 14 in the periphery of the joint portion of the seat rail 15 can further be enhanced.

In this configuration, the welding of the pivot frame 14 is performed in the sequence from the first to the fifth steps as described above. Therefore, even though there is an assembly error when inserting and welding the left and right pivot frames 14 in a state in which the seat rail 15 and the back stay 16 are assembled, the seat rail 15 and the back stay 16 can easily be inserted into the pivot frame 14, and the seat rail 15 and the back stay 16 can be joined to the pivot frame with a favorable welding quality.

In this configuration, the seat rail front portion 15F and the back stay front portion 16F are formed into a pipe shape, and the peripheral lengths of the elongated holes 71A, 71B are formed into the elongated holes having the length equal to or longer than the peripheral lengths of the seat rail front portion 15F and the back stay front portion 16F, long welding lengths can be secured, and the welding strength can be secured further easily.

The above-described embodiment is only for describing a mode of the present invention, and may be modified and applied arbitrarily without departing the range of the main scope of the present invention.

For example, in the embodiment described above, a case where the present invention is applied to the frame structure in which the seat rails 15 and the back stays 16 are welded to the rear portions of the pivot frames 14 has been described. However, the invention is not limited thereto, and can be applied widely to the frame structure in which the seat rails 15 are welded to the rear portions of the pivot frame 14.

The present invention is also applicable those other than the joint portions of the pivot portions, that is, may be applicable to the frame structure in which a hollow box-shaped member is provided by bending ends of the pair of plate members and welding the ends portions thereof and the plurality of pipes are welded to the box-shaped member. In this case, the load that the welded portions between the box-shaped member and the pipes receive by the bending moment can be minimized by forming hole portions extending along the axis of the pipes on the side surfaces of the box-shaped member and by welding the box-shaped member and the pipe along the peripheral edges of the hole portions, so that the bending strength can be secured easily.

Also, by employing the elongated holes which extend along the axes of the pipes in side view as the hole portions, the welding length can be increased, and the strength of the welding portion can be enhanced.

In the above-described embodiment, a case where the present invention is applied to the frame structure of the automatic two-wheeled vehicle 1 shown in FIG. 1 has been described. However, the invention is not limited thereto, and is applicable widely to the frame structures of the saddle type vehicles. The saddle type vehicle includes general vehicles which allow the riders to ride astride the vehicle bodies, and includes not only the automotive two-wheeled vehicle (including an autocycles), but also three-wheeled vehicles or four-wheeled vehicles categorized as ATV (rough-terrain traveling vehicles).

REFERENCE NUMERALS 1 automatic two-wheeled vehicle (saddle type vehicle)
2 vehicle body frame
14 pivot frame
15 seat rail
15F seat rail front portion
15R seat rail rear portion
16 back stay
16F back stay front portion
27 rear wheel
28 rear arm
32, 33 cross pipe
71 elongated hole
71A elongated hole (hole portion)
71B elongated hole (lower hole portion)
81A front side pivot frame half
81B back side pivot frame half
82 front side cylinder
82A front projecting portion
84 rear side first cylinder (seat rail insertion opening)
86 rear side second cylinder (back stay insertion opening)
W outer peripheral edge (opening end edge)
W1 front edge portion
W2 rear edge portion
W3 rear upper edge portion
W4 upper edge portion

The invention claimed is:

1. A frame structure for a saddle vehicle comprising:
a pair of left and right pivot frames (14) configured to pivotably support a rear arm (28) for supporting a rear wheel (27) via a shaft at a rear portion thereof;
a seat rail (15) welded to the rear portion of each of the pivot frames (14) and extending rearward and upwardly;
a cross pipe (32) provided between the left and right pivot frames (14), wherein the cross pipe (32) is provided on an axis (15L) of the front portion of the seat rail (15) at a lower portion thereof;

wherein a hole portion (71A) extending along an axis of a front portion of the seat rail (15) is provided on a side surface of each of the pivot frames (14), each of the pivot frames (14) and the front portion of the seat rail (15) are welded along a peripheral edge of the hole portion (71A), each of the pivot frames (14) is formed by joining opening end edges (W) of left and right plate portions (81A, 81B) mated at their edges, a seat rail insertion opening (84) is formed at a rear upper portion of each of the pivot frames (14) by the left and right plate portions (81A, 81B), the hole portion (71A) is provided on both the left and right plate portions (81A, 81B), a back stay insertion opening (86) is provided at a position downward of the seat rail insertion opening (84) of each of the pivot frames (14), a lower hole portion (71B) is provided on a side surface of the back stay insertion opening (86) so as to extend along an axis (16L) of the front portion of the back stay (16), and each of the pivot frames (14) and the front portion of the back stay (16) are welded along the peripheral edge of the lower hole portion (71B);

a front edge (W1) of the left and right plate portions (81A, 81B) and an edge (W3) between the seat rail insertion opening (84) and the back stay insertion opening (86) are welded together;

an assembly of the seat rail (15) and the back stay (16) are inserted into the seat rail insertion opening (84) and the back stay insertion opening (86);

wherein the hole portion (71A) is welded on the outside in the vehicle width direction of the left and right plate portions (81A, 81B) and the seat rail (15), and the lower hole portion (71B) is welded on the outside in the vehicle width direction and the back stay (16);

wherein the hole portion (71A) is welded on the inner side in the vehicle width direction and the seat rail (15) and the lower hole portion (71B) is welded on the inner side in the vehicle width direction and the back stay (16), and an upper edge (W4) and a rear edge (W2) of the left and right plate portions (81A, 81B) are welded together.

2. The frame structure for a saddle vehicle according to claim 1, wherein the front portion of the seat rail (15) has a pipe portion, and the hole portion (71A) is an elongated hole having a peripheral length for receiving the front portion of the seat rail (15).

3. The frame structure for a saddle vehicle according to claim 1, further comprising a main frame (12) that is welded to the front portion of the pivot frame (14) and extends frontwards, wherein the cross pipe (32) is provided on an axial line (12L) at a rear portion of the main frame (12).

* * * * *